United States Patent [19]
Droscha

[11] Patent Number: 5,369,332
[45] Date of Patent: Nov. 29, 1994

[54] DEVICE THAT FACILITATES WORKING AT A COMPUTER MONITOR

[76] Inventor: Nikolaus Droscha, Schönblick 37, 7505 Ettlingen 8, Germany

[21] Appl. No.: 939,191

[22] Filed: Sep. 2, 1992

[30] Foreign Application Priority Data

Sep. 12, 1991 [DE] Germany .............. 4130248

[51] Int. Cl.⁵ .............................. H01J 29/89
[52] U.S. Cl. .................... 313/478; 313/238; 359/609; 359/601; 348/834
[58] Field of Search ............ 313/478, 479, 480, 238; 359/511, 600, 601, 609; 358/245, 251, 252, 253, 255; 348/834, 842, 841, 836

[56] References Cited

U.S. PATENT DOCUMENTS

| | | | |
|---|---|---|---|
| 2,598,072 | 5/1952 | Rose | 358/255 |
| 5,069,529 | 12/1991 | Takahashi | 359/601 |
| 5,218,474 | 6/1993 | Kirschner | 358/252 X |
| 5,237,453 | 8/1993 | Jones | 358/255 X |

FOREIGN PATENT DOCUMENTS

| | | |
|---|---|---|
| 2915335 | 10/1980 | Germany . |
| 3035619 | 4/1982 | Germany . |
| 8326282 | 6/1984 | Germany . |
| 3834315 | 10/1988 | Germany . |
| 8908883 | 12/1989 | Germany . |
| 9103071 | 3/1991 | Germany . |
| 442695 | 2/1936 | United Kingdom . |
| 483841 | 4/1938 | United Kingdom . |
| 1382686 | 2/1975 | United Kingdom . |

*Primary Examiner*—Donald J. Yusko
*Assistant Examiner*—Ashok Patel
*Attorney, Agent, or Firm*—Sprung Horn Kramer & Woods

[57] ABSTRACT

A device for relieving strain on the eyes of someone working at a computer monitor combines wide applicability with extreme simplicity. The device comprises a flat shield around the edges of the monitor housing.

21 Claims, 2 Drawing Sheets

DEVICE THAT FACILITATES WORKING AT A COMPUTER MONITOR

BACKGROUND OF THE INVENTION

The invention concerns a device for relieving strain on the eyes of someone working at a computer monitor. Also described are advantageous embodiments of a monitor housing that will accommodate the device.

Working at a monitor involves complex physical and mental stress and strain, primarily on the eyes. The monitor must be variable enough to establish the correct eye-to-screen distance and to adapt to various sitting postures. Relieving eye strain is especially necessary because of the extra stress it produces on the operator.

The visual field is the area of the environment covered by an immobile eye in a stationary head. The field can be studied with an instrument called a perimeter. The overlap of the visual fields from both eyes results in the normal-sighted in an uninterrupted apparent expanse bounded by a curve and centered approximately symmetrical around the nose. This composite field can be stressed by movement and sources of light beyond the object of attention and in the field of vision.

The box-like antiglare devices disclosed in German 3 834 315 A1, GM G 8 908 883.2, and G 9 103 071.4 for example have not been accepted in practice.

SUMMARY OF THE INVENTION

The object of the present invention is accordingly a device for substantially relieving or completely eliminating strain on the eyes of someone working at a monitor.

This object is attained in accordance with the invention by a flat shield around the edges of the monitor housing. The shield extensively blocks movement and sources of light beyond the monitor and in the field of vision. It is practical for the visible area of the shield to be 2 to 25 times as large as the visible area of the monitor's screen, depending on the size of the screen. If the screen measures a conventional 14" for example, it will be practical for the shield to measure 2 to 6 times the visible area of the shield. The dimensions and outer contour of the screen can be individually adapted to the lighting conditions around the monitor, to the contours of the individual operator's field of vision, and to aesthetic demands. The shield in no way prevents the operator from talking to people on the other side of it.

It is of advantage for the surface of the shield visible to the operator to be uniform in appearance. It can for example basically be all white. It can also be surfaced with a light-diffusing material, a honeycomb structure for example.

It is also of advantage for the outer contour of the shield to match the outer contour of the operator's field of vision. The contour can have a saddle in the middle.

It is practical for the shield to be capable of being secured somehow directly to the monitor housing. The shield can be oriented with its major plane paralleling the surface of the screen. It can also be at an angle thereto. One advantageous embodiment of the shield fits over the housing, in which case appropriate accommodating recesses or holders can to advantage be provided during the manufacturing process. The housing can for this purpose advantageously be designed with an integrated adapter for accommodating the shield.

The shield can to advantage be cut in one piece out of an essentially flat material. One advantageous embodiment of the shield has various curves that can be followed in cutting out various sizes to match the outer contours of the visual fields of operators of various heights.

The curves for cutting out various sizes of shield and hence blocking off the visual fields of operators of various heights are plotted in terms of an optimal eye-to-screen distance of approximately 75 cm in accordance with the German Industrial Standards (DIN). Curves representing the following percentiles can be plotted on the shield in accordance with the following heights.

| Operator height, cm | Percentile |
| --- | --- |
| 150–160 (innermost curve) | 1 |
| 160–165 | 2 |
| 165–170 | 3 |
| 170–175 | 4 |
| 175–180 | 5 |
| 180–185 | 6 |
| 185–190 (outermost curve) | 7 |

A scale dividing the visual field into seven increments should generally be adequate.

It can also be advantageous for curves to be plotted on the shield for fitting it to housings of various dimensions.

The shield can be made of various materials, e.g. metal, plastic, or cardboard. The rigidity of cardboard in particular makes it possible to mount a shield made thereof on the monitor just by forcing the shield over it tight, which satisfies the demand for an effective and cost-effective device that facilitates working at a computer monitor. Another advantageous embodiment of the shield can have a rim of metal or plastic or a specifically adapted frame of wood for example for slipping the shield over the housing.

The operator can then, especially if the shield is cardboard, simply trim the shield to the curve plotted for blocking off the visual field associated with his individual height or to the individual lighting conditions. Anomalies in the field of vision can simultaneously be taken into account.

The curves can differ in nature. They can be printed, scored, or perforated for example. The shape can essentially be of any color appropriate in relation to the environment and monitor.

The shield can in a practical way be slipped over the housing in contact with three of its sides and with the shield's flat parts above the housing's lower edge.

The shield can also to advantage be provided with scoring so that parts of it can be folded forward or back to additionally block out any sources of light in the field of vision. A field of vision that is impinged on to one side more than the other can accordingly be equalized. The shield can initially be 70 cm high and 100 cm wide.

One practical embodiment of the shield is made of a semitransparent ("one-way") or translucent material, abraded colorless acrylic or a textile for example. This by itself will adequately block out any sources of light beyond the monitor and in the field of vision.

To make it more adaptable the shield can in a practical way be in several, three for example, components. The main component of the shield can in this event block out from the upper field of vision approximately 50% of the light entering the field from above the monitor. The two lower wings will then equally block out any high intensities encountering the keyboard and copy. The various components of the shield can in a practical way be secured together and to the monitor housing in various ways with resilient structural H section. The H section can to advantage be secured around the housing with hollow flanges and a strip of elastic.

The novel shield will substantially relieve strain on the eyes and specifically on the eye muscles of someone working at a computer monitor. A fundamental improvement in the problematics of working at a computer is accordingly to be expected.

Embodiments of the invention will now be specified by way of example with reference to the drawings, wherein

DETAILED DESCRIPTION OF THE INVENTION

Figure 1:
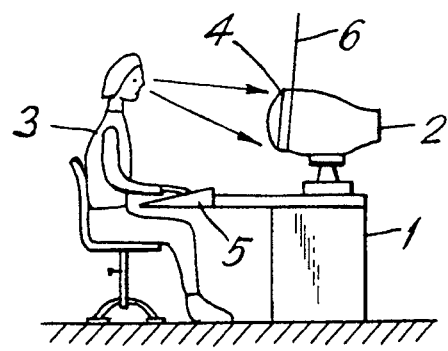
FIG. 1 illustrates an operator working at a computer with a shield on the monitor housing.

Evident in the schematic representation in FIG. 1 is a computer monitor 2 on a desk 1. An operator 3 watches the monitor's screen 4 and types on a keyboard 5. A flat shield 6 fits around the monitor's housing, substantially blocking out annoying events from the field of vision.

Figure 2:
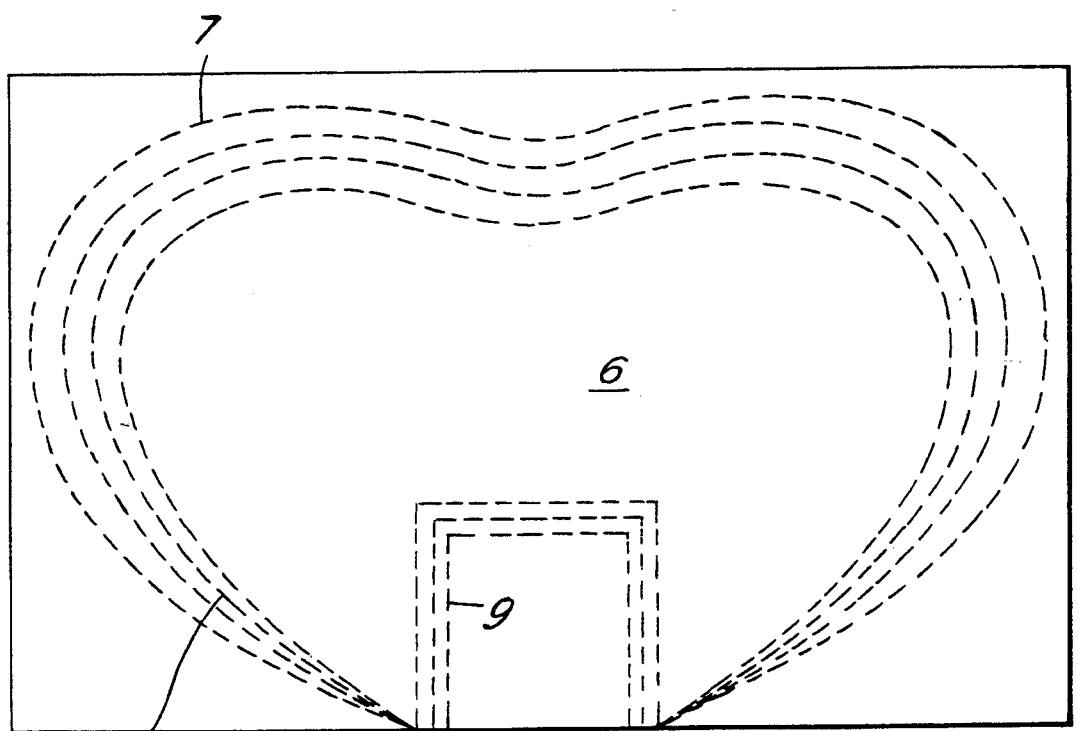
FIG. 2 is a front view of a shield like that illustrated in FIG. 1 with previously plotted trimming curves.

FIG. 2 is a front view of such a shield 6. Curves intended as guides for trimming the shield to conform to the outer contours of the field 7 of vision of operators of various heights, called field percentiles, are provided in the form of scores 8. A rectangular indentation 9 in the lower edge of shield 6 allows it to fit over the housing of monitor 2 (as in FIG. 1).

Figure 3:
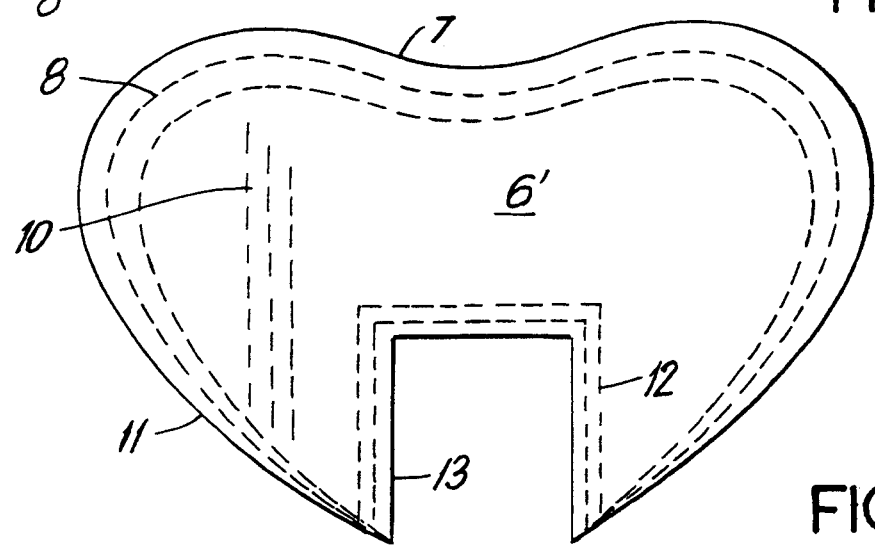
FIG. 3 illustrates another version of the shield with folding sides.

The left wing 11 of the alternative version of shield 6' illustrated in FIG. 3 has fold lines 10 that allow it to be folded in to block out annoying lateral light. Such lines can of course be positioned and oriented differently as necessary. They are generally applied to the rear in the form of perforated dots.

A largest indentation 12 and a smallest indentation 13 can be established ahead of time with perforations, allowing shield 6' to be adapted to monitors of different dimensions, to a monitor with a 14" screen for example.

Figure 4:
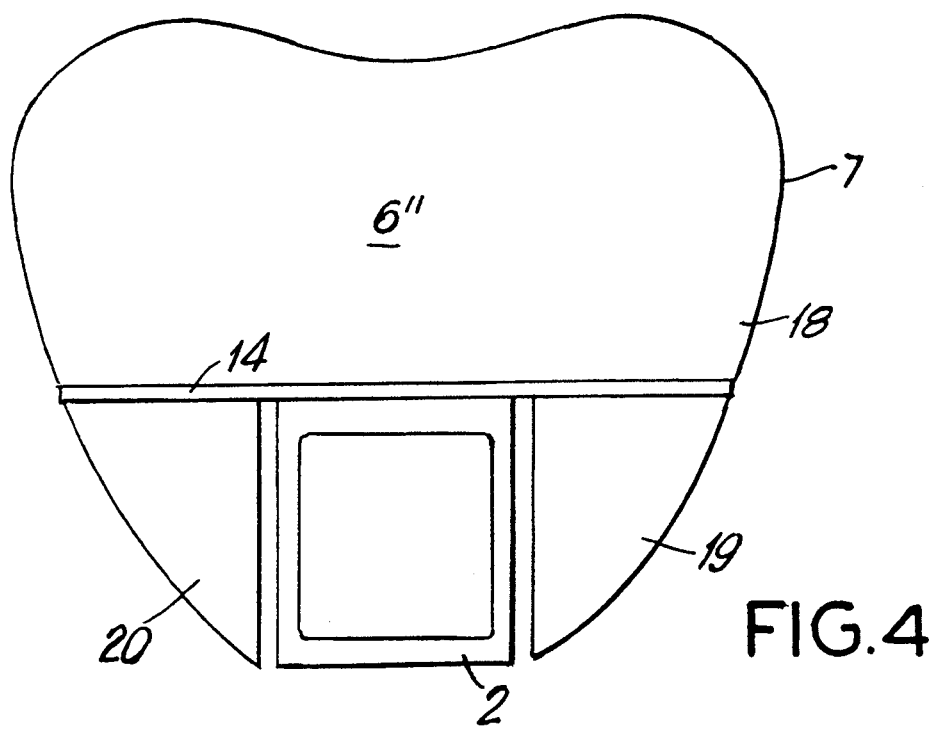
FIG. 4 illustrates a shield comprising three components.
Figure 5:
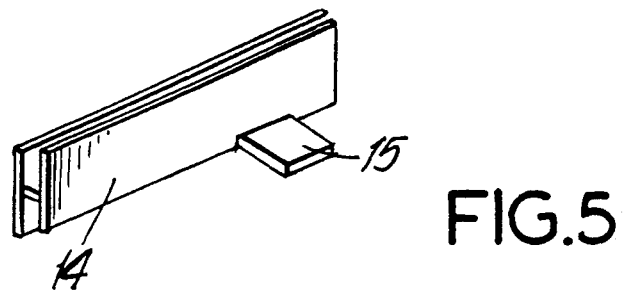
FIG. 5 is an isometric view of an H section to be employed for the divided shield illustrated in FIG. 4.

The shield 6" illustrated in FIG. 4 is in three components 18, 19, and 20. The components are inserted in structural H section 14. The rear of H section 14 is provided with hollow flanges 15 as shown in FIG. 5. The section can be secured to the housing with a rubber band through the flanges.

Figure 6:
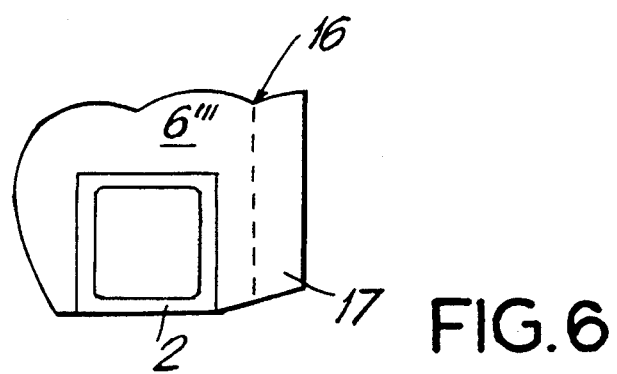
FIG. 6 is an unsymmetrical shield with a single folding wing.

The shield 6'" illustrated in FIG. 6 is, in contrast to those illustrated in FIGS. 2, 3, and 4, unsymmetrical and has a single wing 17 on the right that can be folded forward along a score 16.

The housing of a monitor to be fitted with a shield of the aforesaid type can to advantage have holders, clips for example, to secure it or its components. A groove around the edges of the housing to insert the shield in is a practical approach. Another advantageous embodiment has a flat band around it that accommodates a rim secured to the shield. In the simplest case, however, the shield can fit directly over the housing with no holders.

For practical applications the shield with its existing trimming and folding scores can be advantageously supplied along with an appropriate measuring rod and instructions and specifications in the form of a ready-to-use set.

Since large and opaque shields could block off too much space overall, it might also be a good idea for the shields to be semitransparent or translucent. This feature could be attained for example with an extremely thin coating of precious metal on an organic synthetic glass, making it possible to see nearby desks while reliably blocking out annoying events from the filed of vision. A wide selection of semitransparent and translucent materials are available. Semitransparent shields are to be oriented such that the operator can be seen but will not be aware of movement and sources of light beyond the object of attention and in the field of vision.

What is claimed is:

1. A device for relieving strain on the eyes of an operator working at a computer monitor, comprising: a flat shield having an outer contour configured to match an outer contour of an operator's field of vision and means for mounting the flat shield around edges of a computer monitor housing and maintaining the shield flat during use.

2. The device as in claim 1, wherein the shield has a visible area which is 2 to 25 times as large as the visible area of a monitor screen on which it is mounted during use.

3. The device as in claim 1, wherein the shield has a surface visible to the operator which is uniform in appearance.

4. The device as in claim 1, wherein the outer contour of the flat shield has a saddle in a middle portion thereof.

5. The device as in claim 1, wherein the means for mounting comprises means for directly securing the shield to a monitor housing.

6. The device as in claim 5, wherein the means for directly securing comprises a cut out to effect the fitting of the shield over the housing.

7. The device as in claim 1, wherein the shield is cut from one piece out of flat material.

8. The device as in claim 7, wherein the shield has a plurality of scores for following to cut out a plurality of contours.

9. The device as in claim 7, wherein the shield is 70 cm high and 100 cm wide.

10. The device as in claim 7, further comprising lines plotted on the shield for fitting it to housings of various dimensions.

11. The device as in claim 1, wherein the shield is made of metal.

12. The device as in claim 1, wherein the shield is made of plastic.

13. The device as in claim 1, wherein the shield is made of cardboard.

14. The device as in claim 1, wherein the shield has scoring to enable parts to be folded forward and back.

15. The device as in claim 1, wherein the shield is made of a semitransparent material.

16. The device as in claim 1, wherein the shield is made of a translucent material.

17. The device as in claim 1, wherein the shield comprises a plurality of separate components.

18. A monitor for use with the shield as in claim 1, comprising a housing and a holder for the shield on the housing.

19. The monitor as in claim 18, wherein the housing constitutes the holder for the shield.

20. The monitor as in claim 19, wherein the housing has a groove along an edge receptive of the shield.

21. The monitor as in claim 19, wherein the housing has a flat band around it that accommodates a rim secured to the shield.

* * * * *